United States Patent
Lee

(10) Patent No.: US 10,949,160 B2
(45) Date of Patent: Mar. 16, 2021

(54) DISPLAY APPARATUS AND CONTROL METHOD THEREOF

(71) Applicant: SAMSUNG ELECTRONICS CO., LTD., Suwon-si (KR)

(72) Inventor: Taehoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/588,128

(22) Filed: Sep. 30, 2019

(65) Prior Publication Data
US 2020/0310738 A1    Oct. 1, 2020

(30) Foreign Application Priority Data

Mar. 25, 2019   (KR) .................. 10-2019-0033825

(51) Int. Cl.
*G06F 3/14* (2006.01)
*G06F 3/0484* (2013.01)
*G09G 5/38* (2006.01)

(52) U.S. Cl.
CPC .......... *G06F 3/1462* (2013.01); *G06F 3/0484* (2013.01); *G09G 5/38* (2013.01); *G09G 2354/00* (2013.01)

(58) Field of Classification Search
None
See application file for complete search history.

(56) References Cited

U.S. PATENT DOCUMENTS

| | | |
|---|---|---|
| 5,134,390 A | 7/1992 | Kishimoto et al. |
| 8,839,143 B2 | 9/2014 | Lee et al. |
| 9,491,403 B2 | 11/2016 | Atkinson |
| 9,756,126 B2 | 9/2017 | Miyake |
| 9,978,337 B2 | 5/2018 | Bae et al. |
| 2012/0050558 A1 | 3/2012 | Nishimura et al. |
| 2012/0176396 A1 | 7/2012 | Harper et al. |

(Continued)

FOREIGN PATENT DOCUMENTS

| | | |
|---|---|---|
| KR | 10-0867131 B1 | 11/2008 |
| KR | 10-2016-0105242 A | 9/2016 |

(Continued)

OTHER PUBLICATIONS

Communication (PCT/ISA/210) dated Jan. 16, 2020 by the International Searching Authority in counterpart International Patent Application No. PCT/KR2019/012695.

(Continued)

*Primary Examiner* — Roy P Rabindranath
(74) *Attorney, Agent, or Firm* — Sughrue Mion, PLLC

(57) ABSTRACT

A display apparatus and a controlling method thereof are provided. The display apparatus includes: a display; a communicator including circuitry configured to communicate with an electronic apparatus; a processor configured to execute instructions to: identify whether blank regions are included in an image for mirroring based on the image for mirroring being received from the electronic apparatus through the communicator, and control to display, on the display, an image of a remaining region excluding the blank regions in the received image based on the blank regions being identified in the received image in a state in which the display is oriented in a predetermined direction.

16 Claims, 16 Drawing Sheets

(56) References Cited

U.S. PATENT DOCUMENTS

| | | | |
|---|---|---|---|
| 2013/0120256 A1* | 5/2013 | Ishidera | G09G 5/36 |
| | | | 345/158 |
| 2014/0132536 A1* | 5/2014 | Ikenaga | G06F 3/1423 |
| | | | 345/173 |
| 2016/0253142 A1 | 9/2016 | Choi et al. | |
| 2017/0237986 A1 | 8/2017 | Choi et al. | |
| 2017/0255304 A1 | 9/2017 | Lee et al. | |
| 2018/0025697 A1* | 1/2018 | Bae | H04N 21/234372 |
| | | | 345/592 |
| 2018/0261185 A1 | 9/2018 | Bae et al. | |

FOREIGN PATENT DOCUMENTS

| | | |
|---|---|---|
| KR | 10-2017-0000714 A | 1/2017 |
| KR | 10-2017-0094745 A | 8/2017 |
| KR | 10-2017-0100968 A | 9/2017 |
| KR | 10-2018-0025763 A | 3/2018 |

OTHER PUBLICATIONS

Communication (PCT/ISA/237) dated Jan. 16, 2020 by the International Searching Authority in counterpart International Patent Application No. PCT/KR2019/012695.

Communication dated Apr. 24, 2020, from the European Patent Office in counterpart European Application No. 19200576.7.

\* cited by examiner

| ELECTRONIC APPARATUS | RESOLUTION | IMAGE RATIO |
|---|---|---|
| FIRST ELECTRONIC APPARATUS | 1080X1920 | 9:16 |
| SECOND ELECTRONIC APPARATUS | 1440X2560 | 9:16 |
| THIRD ELECTRONIC APPARATUS | 1440X2960 | 9:18.5 |

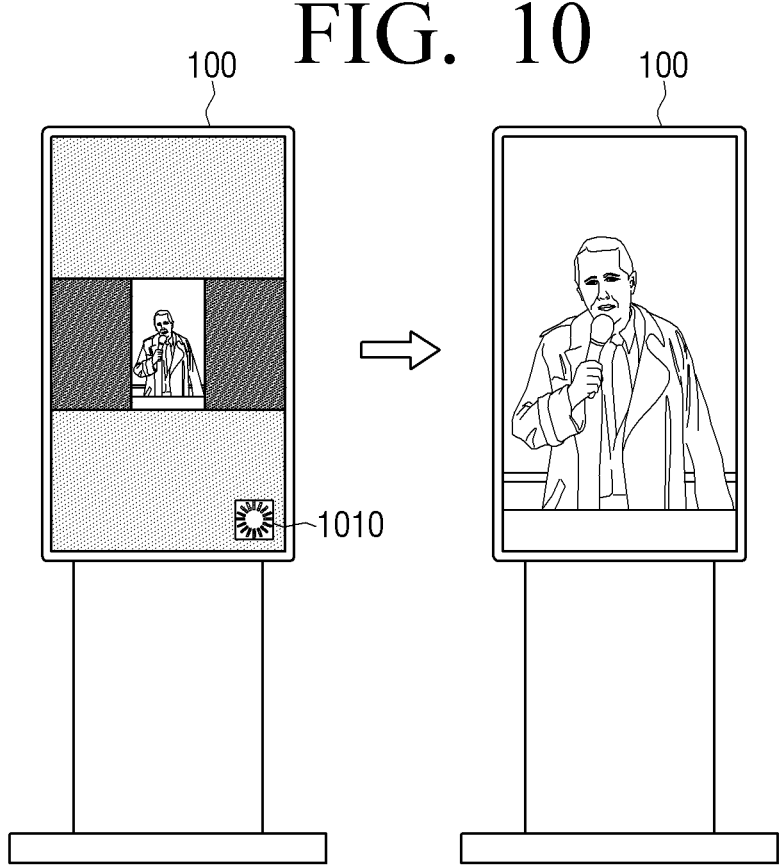

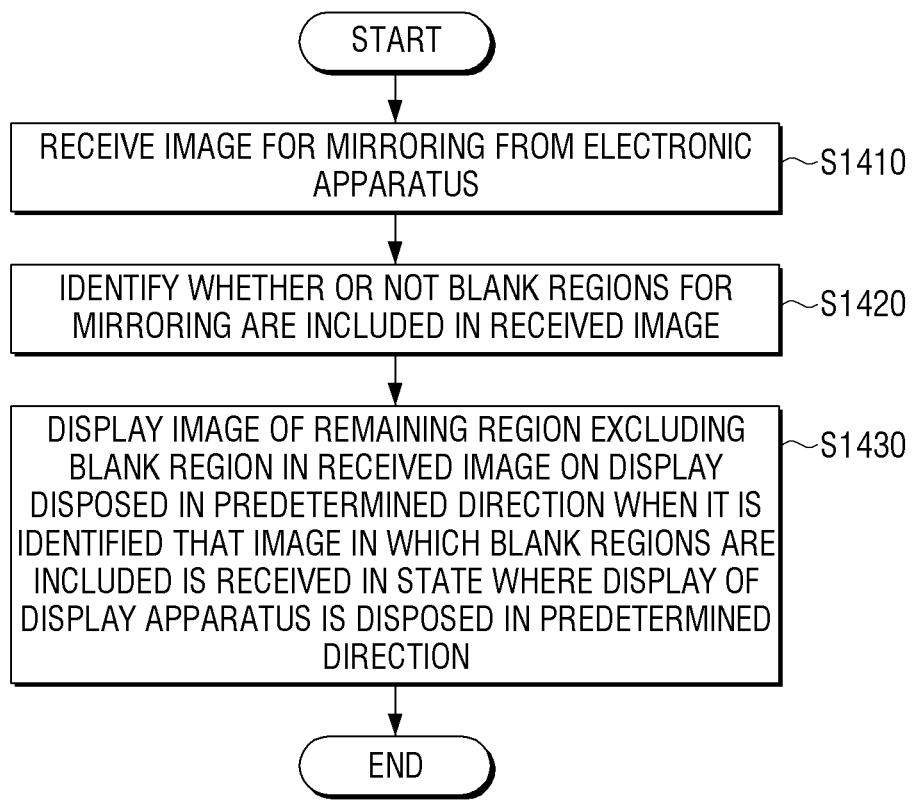

DISPLAY APPARATUS AND CONTROL METHOD THEREOF

CROSS-REFERENCE TO RELATED APPLICATION(S)

This application is based on and claims priority under 35 U.S.C. § 119 to Korean Patent Application No. 10-2019-0033825, filed on Mar. 25, 2019, in the Korean Intellectual Property Office, the disclosure of which is incorporated by reference herein in its entirety.

BACKGROUND

1. Field

The disclosure relates to a display apparatus and a control method thereof, and more particularly, to a display apparatus capable of mirroring and displaying an image that is being displayed on an electronic apparatus, and a control method thereof.

2. Description of Related Art

With the evolution of electronic technology, various electronic apparatuses have recently been developed. In particular, an electronic apparatus supporting a mirroring service has recently been developed.

The mirroring service refers to a service for displaying (or sharing) an image that is being displayed on a display of the electronic apparatus, on a display of another electronic apparatus. Thus, the mirroring service allows a user to watch an image that is being displayed on a display of an electronic apparatus such as a laptop computer, a tablet personal computer (PC), or a smartphone, through a display of a display apparatus such as a television or a monitor.

Meanwhile, the mirroring service has been provided according to a Miracast standard. In particular, a resolution or a ratio of a display for each manufacturer may vary. Thus, when the electronic apparatus transmits an image for mirroring to the display apparatus, resolution of the image that is being displayed on the electronic apparatus is converted according to the Miracast standard, and the image of which resolution is converted is transmitted to the display apparatus. For example, the electronic apparatus inserts blank regions into the top and bottom or the left and right of the image to convert the resolution of the image to correspond to the Miracast standard, and transmits the image of which resolution is converted to the display apparatus.

As a result, the blank regions may be included in the image displayed on the display apparatus. However, such blank regions may be a factor that hinders the user from watching the image comfortably.

SUMMARY

Provided are a display apparatus capable of displaying an image of a remaining region excluding blank regions in an image for mirroring, and a control method thereof.

Additional aspects will be set forth in part in the description which follows and, in part, will be apparent from the description, or may be learned by practice of the presented embodiments.

In accordance with an aspect of the disclosure, a display apparatus includes: a display; a communicator including circuitry configured to communicate with an electronic apparatus; a processor configured to execute instructions to: identify whether blank regions are included in an image for mirroring based on the image for mirroring being received from the electronic apparatus through the communicator, and control to display, on the display, an image of a remaining region excluding the blank regions in the received image based on the blank regions being identified in the received image in a state in which the display is oriented in a predetermined direction.

The image received from the electronic apparatus may be received based on a Miracast standard.

The processor may be further configured to execute the instructions to crop the received image to obtain the image of the remaining region excluding the blank regions, scale a resolution of the cropped image to correspond to a resolution of the display, and control to display, on the display, the image of which the resolution is scaled.

The processor may be further configured to execute the instructions to: obtain, from the electronic apparatus, identification information of the electronic apparatus and identify an image ratio corresponding to the identification information based on pre-stored information on image ratios for each of plural external electronic apparatuses, and crop, based on the identified image ratio, the received image to obtain the image of the remaining region corresponding to the image ratio.

The processor may be further configured to execute the instructions to control to display, on the display oriented in a vertical direction, the image of the remaining region excluding the blank regions based on the blank regions being identified in the received image in a state in which the display is oriented in the vertical direction.

The processor may be further configured to execute the instructions to control to display, on the display, a user interface (UI) item selectable for displaying the image of the remaining region excluding the blank regions and to display, on the display oriented in the vertical direction, the image of the remaining region on based on a user command for selecting the UI item being received.

The processor may be further configured to control to rotate the display to a vertical direction and to display, on the display oriented in the vertical direction, the image of the remaining region excluding the blank regions, in a case in which the image including the blank regions is received while the display is oriented in a horizontal direction.

The processor may be further configured to execute the instructions to control to display, on the display, the received image, control to display a UI item selectable for rotation of the display, control to rotate the display to a vertical direction based on a user command for selecting the UI item being received, and control to display, on the display oriented in the vertical direction, the image of the remaining region excluding the blank regions, in a case in which the image including the blank regions is received while the display is oriented in a horizontal direction.

The processor may be further configured to execute the instructions to control to display, on the display, the received image, control to display, on the display, a UI item selectable for rotation of the display, control to rotate the display to a horizontal direction based on a user command for selecting the UI item being received, and control to display, on the display oriented in the horizontal direction, the received image, in a case in which the received image does not include the blank regions and is received while the display is disposed in a vertical direction.

The processor may be further configured to execute the instructions to identify black regions in the received region and determine that regions corresponding to the black regions are the blank regions.

The received image may include a content that is being displayed on the electronic apparatus, and the processor may be configured to execute the instructions to control to display, on the display, the image of the remaining region excluding the blank regions based on identifying that the blank regions are positioned to a left and to a right of the remaining region corresponding to the content.

In accordance with another aspect of the disclosure, a control method of a display apparatus, includes: receiving an image for mirroring from an electronic apparatus; identifying whether blank regions are included in the received image; and displaying, on a display of the display apparatus, an image of a remaining region excluding the blank regions in the received image based on the blank regions being identified in the received image in a state in which the display is oriented in a predetermined direction.

The image received from the electronic apparatus may be received based on a Miracast standard.

The displaying may include: cropping the received image to obtain the image of the remaining region excluding the blank regions; scaling a resolution of the cropped image to correspond to a resolution of the display; and displaying, on the display, the image of which the resolution is scaled.

The cropping may include: receiving, from the electronic apparatus, identification information of the electronic apparatus; identifying an image ratio corresponding to the identification information based on pre-stored information on image ratios for each plural external electronic apparatuses; and cropping, based on the identified image ratio, the received image to obtain the image of the remaining region corresponding to the image ratio.

The displaying may include displaying, on the display oriented in a vertical direction, the image of the remaining region excluding the blank regions based on the blank regions being identified in the received image in a state in which the display is oriented in the vertical direction.

The displaying on the display oriented in the vertical direction may include: displaying, on the display, a user interface (UI) item selectable for displaying the image of the remaining region excluding the blank regions; and displaying, on the display oriented in the vertical direction, the image of the remaining region based on a user command for selecting the UI being received.

The displaying may include, based on the image including the blank regions being received while the display is oriented in a horizontal direction: rotating the display to a vertical direction; and displaying, on the display oriented in the vertical direction, the image of the remaining region excluding the blank regions.

The displaying may include, based on the image including the blank regions being received while the display is oriented in a horizontal direction: displaying, on the display oriented in the horizontal direction, the received image; displaying, on the display oriented in the horizontal direction, a UI item selectable for rotation of the display; rotating the display to a vertical direction based on a user command for selecting the UI item being received; and displaying, on the display oriented in the vertical direction, the image of the remaining region excluding the blank regions.

The displaying may include, based on the image not including the blank regions being received while the display is oriented in a vertical direction: displaying, on the display oriented in the vertical direction, the received image; displaying, on the display oriented in the vertical direction, a UI item selectable for rotation of the display; rotating the display to a horizontal direction based on a user command for selecting the UI item being received; and displaying, on the display oriented in the horizontal direction, the received image.

In accordance with another aspect of the disclosure, a display apparatus includes: a memory storing instructions; and a processor configured to execute the instructions to: identify whether blank regions are included in an image for mirroring based on the image for mirroring being received from an electronic apparatus, and control to display, on a display, an image of a remaining region excluding the blank regions in the received image based on the blank regions being identified in the received image in a state in which the display is determined to be oriented in a predetermined direction.

The processor may be further configured to execute the instructions to crop the received image to obtain the image of the remaining region excluding the blank regions, scale a resolution of the cropped image to correspond to a resolution of the display, and control to display, on the display, the image of which the resolution is scaled.

The processor may be further configured to execute the instructions to: obtain, from the electronic apparatus, identification information of the electronic apparatus and identify an image ratio corresponding to the identification information based on pre-stored information on image ratios for each of plural external electronic apparatuses, and crop, based on the identified image ratio, the received image to obtain the image of the remaining region corresponding to the image ratio.

The processor may be further configured to execute the instructions to control to display, on the display oriented in a vertical direction, the image of the remaining region excluding the blank regions based on the blank regions being identified in the received image in a state in which the display is oriented in the vertical direction.

The processor may be further configured to control to rotate the display to a vertical direction and to display, on the display oriented in the vertical direction, the image of the remaining region excluding the blank regions, in a case in which the image including the blank regions is received while the display is oriented in a horizontal direction.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a view for describing a user interface (UI) for scaling of an image according to an embodiment;

FIG. 14 is a flowchart for describing a control method of a display apparatus according to an embodiment.

DETAILED DESCRIPTION

First, general terms in this specification and claims are used in consideration of functions, operations, and structures described in the disclosure. However, these terms may vary depending on an intention of those skilled in the art, legal or technical interpretation, the emergence of a new technology, and the like. In addition, some terms are terms arbitrarily selected by an applicant. These terms may be interpreted by the meanings defined herein, and/or may be interpreted based on a general content of the specification and usual technical knowledge in the art as long as they are not specifically defined.

It is understood that, hereinafter, expressions such as "at least one of," when preceding a list of elements (e.g., "at least one of A and B" or "at least one of A or B"), modify the entire list of elements (i.e., only A, only B, or both A and B) and do not modify the individual elements of the list.

Also, in describing embodiments, when a detailed description for known functions or configurations related to the disclosure may unnecessarily obscure the gist of the disclosure, the detailed description therefor will be abbreviated or omitted.

Furthermore, one or more embodiments will hereinafter be described in detail with reference to the accompanying drawings and contents described in the accompanying drawings, but the disclosure is not limited or restricted by these embodiments.

Hereinafter, one or more embodiments will be described in detail with reference to the accompanying drawings.

Figure 1:
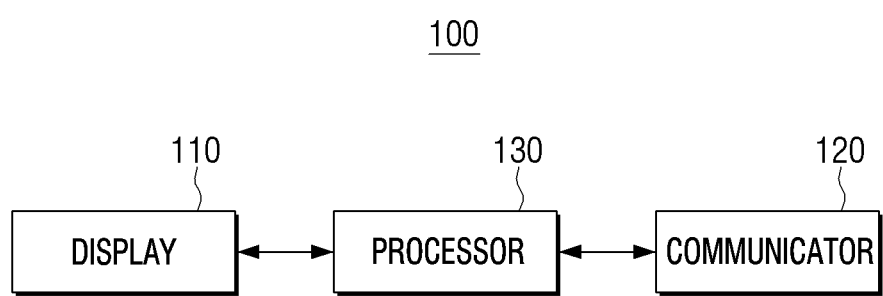
FIG. 1 is a block diagram for describing a display apparatus according to an embodiment.

FIG. 1 is a block diagram for describing a display apparatus 100 according to an embodiment.

A display apparatus 100 according to an embodiment may be a smart television (TV). However, this is only an example, and the display apparatus 100 may be various electronic apparatuses including a display, such as a computer, a laptop computer, a tablet personal computer (PC), a digital camera, a camcorder, a personal digital assistant (PDA), a smartphone, and the like.

Referring to FIG. 1, the display apparatus 100 according to an embodiment includes a display 110, a communicator 120, and a processor 130.

The display 110 may display various screens (e.g., simultaneously display various screens on different areas of the display 110). As an example, the display 110 may mirror and display an image that is being displayed on an electronic apparatus. Alternatively, the display 110 may display an image of a remaining region excluding blank regions in an image for mirroring.

In addition, the display 110 may display various images such as broadcasting contents, multimedia contents and the like, as well as various user interfaces (UIs) and icons.

The display 110 may be rotated. In detail, the display 110 may be disposed in a horizontal form or a vertical form according to a user command for rotation. To this end, the display apparatus 100 may further include a driver for rotating the display 110.

The display 110 may be implemented in various manners, such as a liquid crystal display (LCD) panel, a light emitting diode (LED) display or backlit display, an organic light emitting diode (OLED) display, a liquid crystal on silicon (LCoS) display, a digital light processing (DLP) display, and the like. In addition, the display 110 may also include a driving circuit, a backlight unit, and the like, and may be implemented in a form such as an a-Si thin film transistor (TFT), a low temperature poly silicon (LTPS) TFT, an organic TFT (OTFT), and the like.

In addition, the display 110 may be implemented by a touch screen by combining with a touch sensor.

The communicator 120 may communicate with the electronic apparatus to transmit and receive various data. For example, the communicator 120 may not only perform communication with the electronic apparatus through a local area network (LAN), an Internet network, and a mobile communication network, but may also perform communication with the electronic apparatus through various communication manners such as Bluetooth, Bluetooth Low Energy (BLE), Wireless Fidelity (WI-FI), Zigbee, Near Field Communication (NFC), and the like.

To this end, the communicator 120 may include various communication modules for performing network communication. For example, the communicator 120 may include at least one of a Bluetooth chip, a WI-FI chip, a wireless communication chip, and the like.

Particularly, the communicator 120 may perform the communication with the electronic apparatus to receive the image for mirroring from the electronic apparatus. Here, the electronic apparatus may be a smartphone, a computer, a laptop computer, or the like, but is not limited thereto. The electronic apparatus may be various electronic apparatuses that may transmit the image that is being displayed on or by the electronic apparatus to the display apparatus 100.

Meanwhile, the communicator 120 may perform communication with an external apparatus to receive broadcasting contents (or broadcasting signals). Here, the broadcasting contents may include at least one of an image, an audio, or additional data (for example, an electronic program guide (EPG)). To this end, the communicator 120 may include a tuner, a demodulator, an equalizer, and the like.

The processor 130 (e.g., at least one processor) controls a general operation of the display apparatus 100. To this end, the processor 130 may include one or more of a central processing unit (CPU), an application processor (AP), or a communication processor (CP).

The processor 130 may drive an operating system and/or an application program to control hardware and/or software components connected to the processor 130, and may perform various types of data processing and calculation. In addition, the processor 130 may load and process commands or data received from at least one of other components in a volatile memory, and store various data in a non-volatile memory.

The processor 130 may control the communicator 120 to perform communication connection with the electronic apparatus. In detail, when a user command for the communication connection with the electronic apparatus is received, the processor 130 may search for a peripheral electronic apparatus through the communicator 120 and control the communicator 120 to perform communication connection with the searched for electronic apparatus. Alternatively, when a signal for requesting communication connection from the electronic apparatus is received in a state where the communicator 120 is activated, the processor 130 may control the communicator 120 to perform the communication connection.

In addition, the processor 130 may receive the image for mirroring from the electronic apparatus. In detail, the processor 130 may transmit a signal for requesting image transmission to the electronic apparatus when a user command for mirroring is received, and display the received image on the display 110 when the image for mirroring is received from the electronic apparatus. Alternatively, the processor 130 may control the communicator 120 to receive the image for mirroring and display the image received from the electronic apparatus on the display 110, when a signal for requesting image reception (or when the image itself and/or a control signal instructing image reception for mirroring) is received from the electronic apparatus in a state where the display apparatus is communication-connected to the electronic apparatus through the communicator 120.

Here, the image for mirroring, which is an image including contents displayed on a display of the electronic apparatus, may be an image having a resolution according to a Miracast standard.

For example, in a case where the resolution according to the Miracast standard is 1920×1080, the processor 130 may receive an image for mirroring of which resolution is 1920×1080 from the electronic apparatus.

Meanwhile, blank regions may be included in the image for mirroring. In detail, blank regions added in a process of converting the resolution of the image according to the Miracast standard may be included in the image for mirroring.

As an example, in a case where an image having resolution of 1920×1080 is being displayed on a display of an electronic apparatus, blank regions are not included in the image for mirroring. The reason is that in this case, the resolution of the image corresponds to the resolution according to the Miracast standard.

As another example, in a case where an image having resolution of 1080×1920 is being displayed on the display of the electronic apparatus, blank regions may be included in a left area and a right area of the image for mirroring. The reason is that in this case, the electronic apparatus adds the blank regions to the left area and the right area of the image to convert the resolution of the image that is being displayed into the resolution according to the Miracast standard and transmits the image to which the blank regions are added as the image for mirroring to the display apparatus 100.

Then, the processor 130 may display (i.e., control to display) the image received from the electronic apparatus on the display 110.

In detail, the processor 130 may display the received image or an image in which the blank regions are excluded from the received image on the display 110 on the basis of a disposition state of the display 110 and whether or not the blank regions for mirroring are included in the image.

Figure 2:
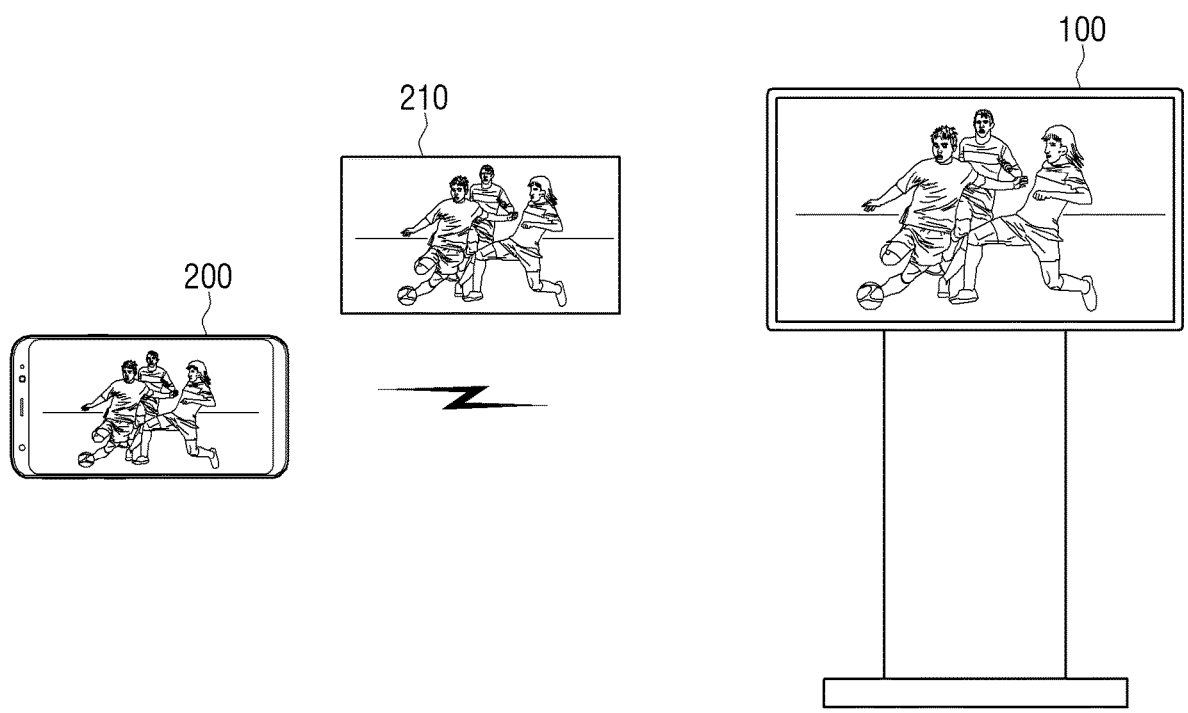
FIG. 2 is a view for describing a mirrored image of the display apparatus according to an embodiment.
Figure 3:
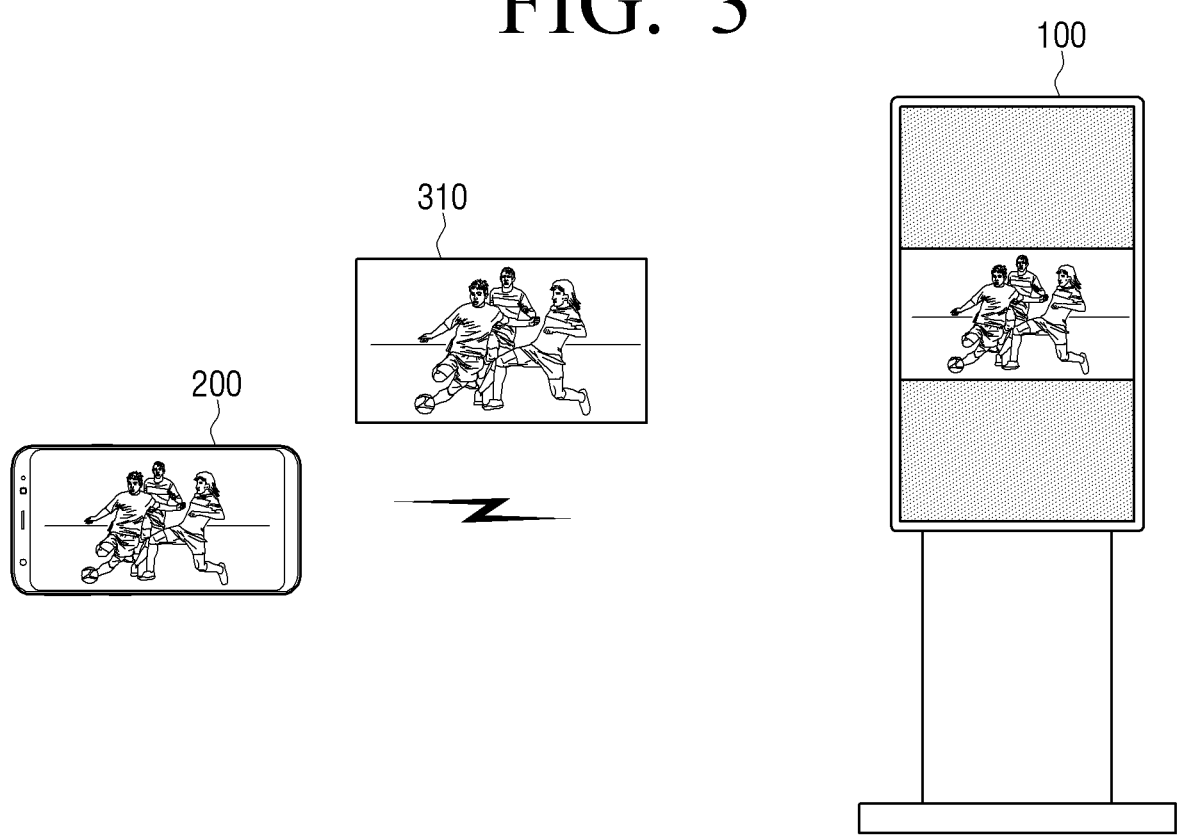
FIG. 3 is a view for describing a mirrored image of the display apparatus according to an embodiment.

For example, in a case where the blank regions for mirroring are not included in the image received from the electronic apparatus, the processor 130 may display the images 210 and 310 for mirroring received from the electronic apparatus 200 on the display 110 regardless of whether the disposition state of the display 100 is horizontal or vertical, as illustrated in FIGS. 2 and 3.

The reason is that in a case where the image 210 in which the blank regions are not included is received in a state where the display 110 is horizontally disposed as illustrated in FIG. 2, a content that is being displayed on the electronic apparatus 200 is displayed over an entire region of the display 110 and thus, the image need not be displayed in a state where resolution of the image is converted. Further, in a case where the image 310 in which the blank regions are not included is received in a state where the display 110 is vertically disposed as illustrated in FIG. 3, when the image is displayed in a state in which resolution of the image is converted to correspond to resolution or a size of the display 110 (that is, when the image is displayed in a state where it is extended in a vertical direction), the image is unnaturally displayed.

Meanwhile, in a case where the blank regions for mirroring are included in the image received from the electronic apparatus 200, the processor 130 may perform different operations depending on the disposition state of the display 110.

Figure 4:
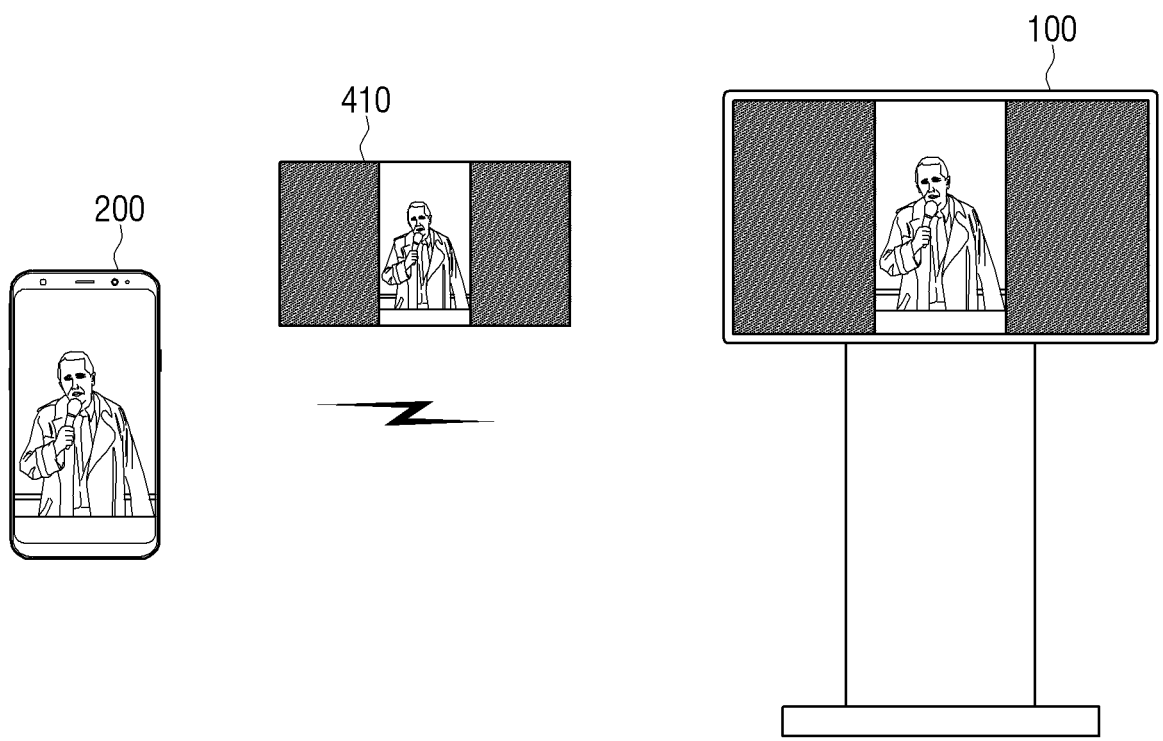
FIG. 4 is a view for describing a mirrored image of the display apparatus according to an embodiment.

In detail, when an image 410 for mirroring in which blank regions are included is received from the electronic apparatus 200 in a state where the display 110 is horizontally disposed as illustrated in FIG. 4, the processor 130 may display the image 410 for mirroring on the display 110.

The reason is that in a case where the image 410 for mirroring in which the blank regions are included is received in the state where the display 110 is horizontally disposed as illustrated in FIG. 4, when the image is displayed in a state in which resolution of the image is converted to correspond to resolution or a size of the display 110 (that is, the image is displayed in a state where it is extended in a horizontal direction), the image is unnaturally displayed.

Figure 5:
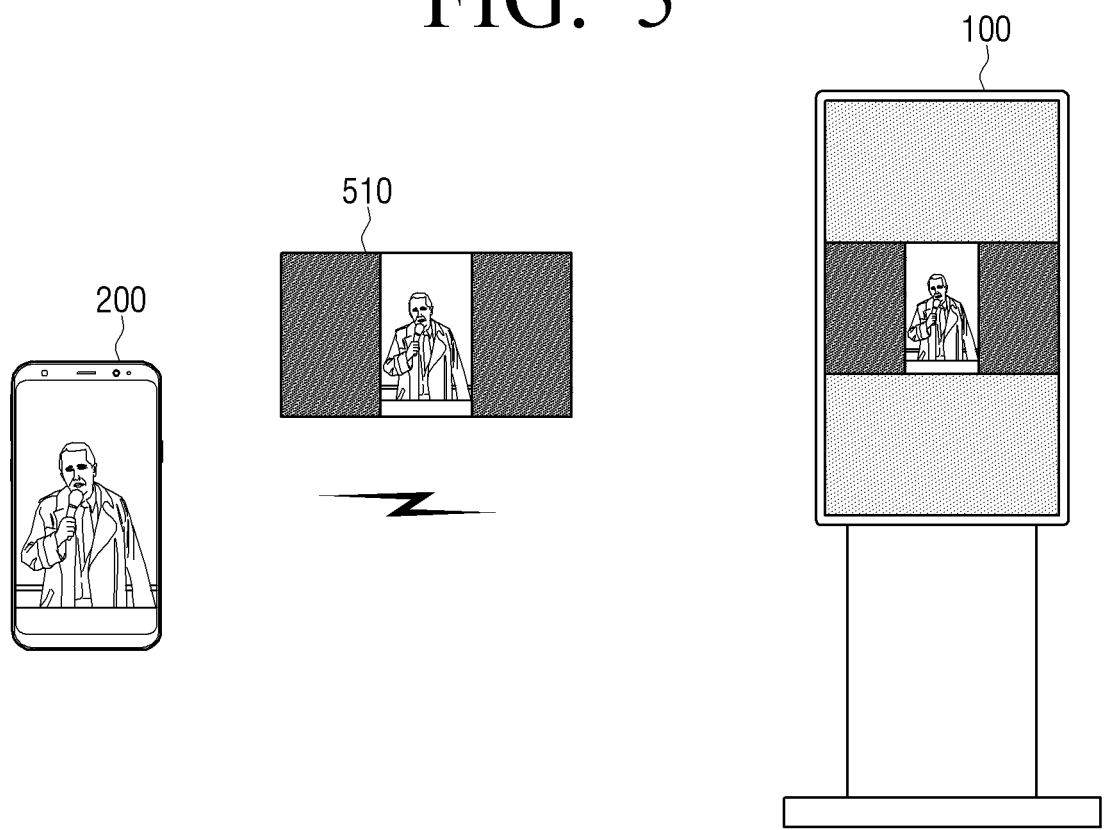
FIG. 5 is a view for describing a mirrored image of the display apparatus according to an embodiment.
Figure 6:
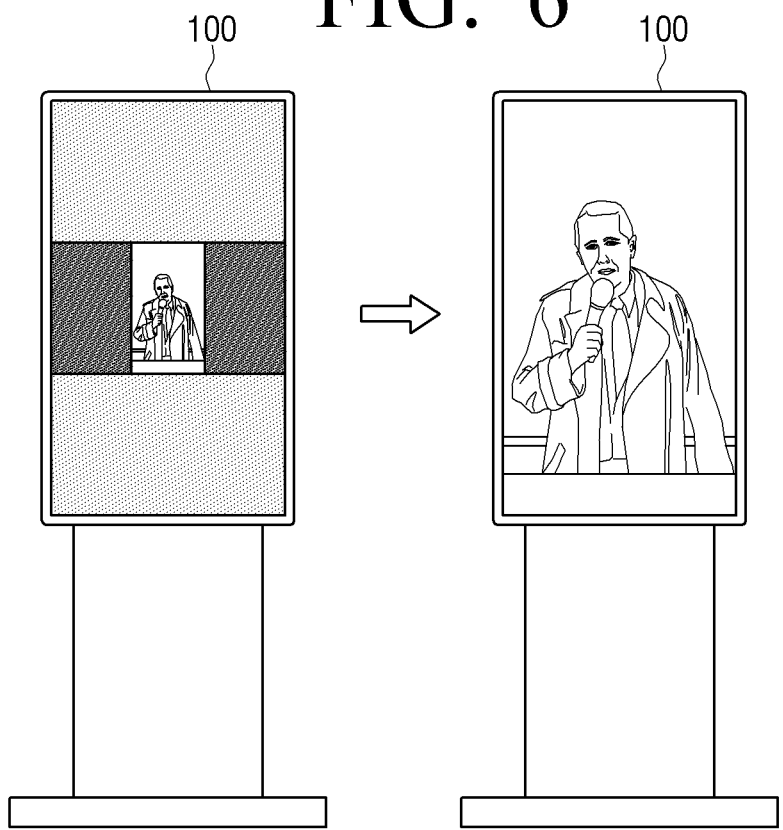
FIG. 6 is a view for describing an example in which an image of a remaining region excluding blank regions is displayed on the display apparatus according to an embodiment.

In addition, when an image 510 for mirroring in which blank regions are included is received from the electronic apparatus 200 in a state where the display 110 is vertically disposed as illustrated in FIG. 5, the processor 130 may display an image of a remaining region excluding the blank regions on the display 110, as illustrated in FIG. 6. Alternatively, the processor 130 may display the image in which the blank regions are included on the display 110 and then display an image of a remaining region excluding the blank regions on the display 110 automatically or on the basis of a user command.

In a case where the image 510 in which the blank regions are included is received in the state where the display 110 is vertically disposed as illustrated in FIG. 5, it is natural to display the image in a state in which resolution of the image is converted to correspond to the resolution or the size of the display 110. When the image is displayed in this manner, a case where viewing of a user is hindered by the blank regions is prevented.

Hereinafter, an operation of the processor 130 in the case where the image 510 in which the blank regions are included is received in the state where the display 110 is vertically disposed as illustrated in FIG. 5 will be described.

Figure 7:
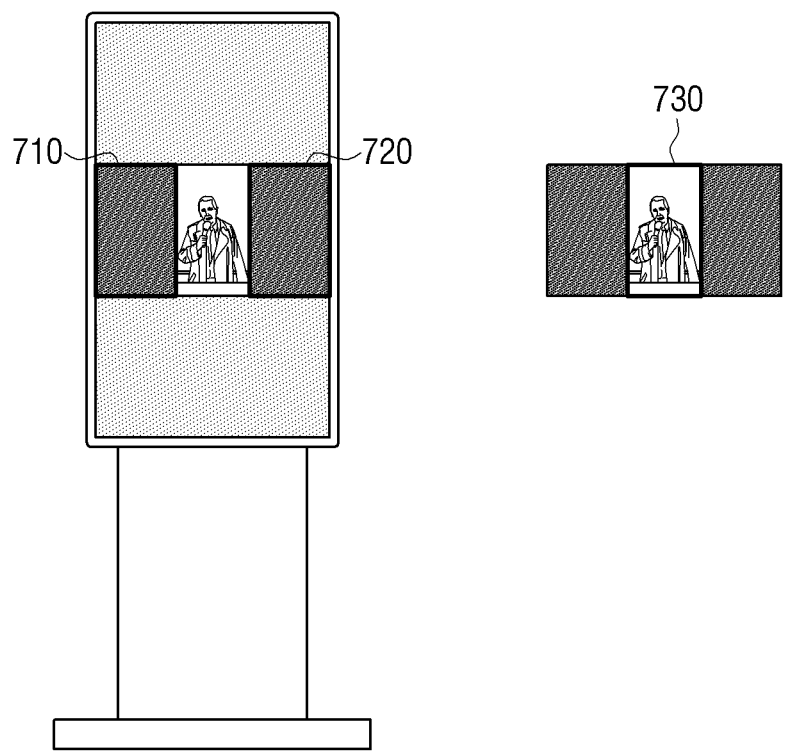
FIG. 7 is a view for describing an operation of the display apparatus in a case where an image in which blank regions are included is received in a state where a display according to an embodiment is vertically disposed.
Figure 8:
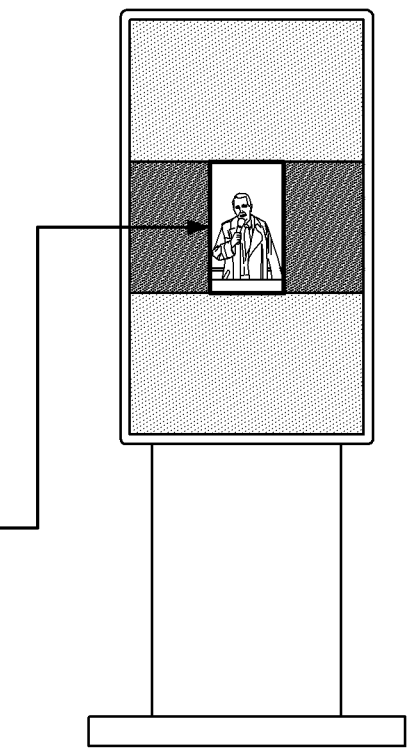
FIG. 8 is a view for describing an operation of the display apparatus in a case where an image in which blank regions are included is received in a state where a display according to an embodiment is vertically disposed.
Figure 9:
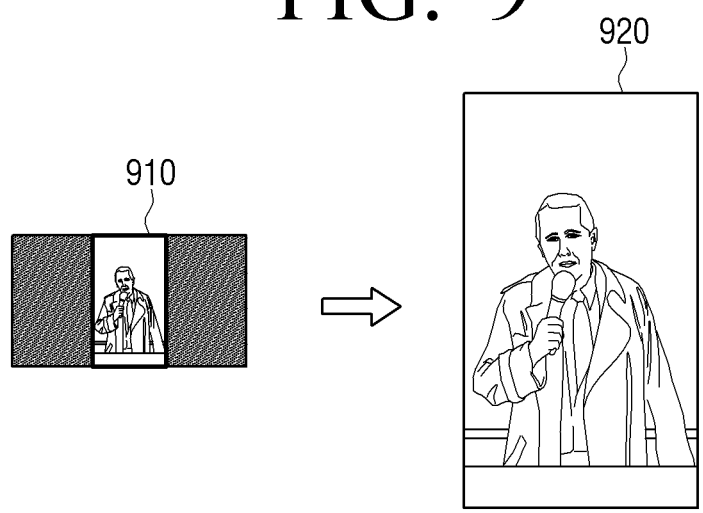
FIG. 9 is a view for describing an operation of the display apparatus in a case where an image in which blank regions are included is received in a state where a display according to an embodiment is vertically disposed.

FIGS. 7 to 9 are views for describing an operation of the display apparatus 100 when an image in which blank regions are included is received in a state where a display according to an embodiment is vertically disposed.

When the image for mirroring is received from the electronic apparatus 200 through the communicator 120, the processor 130 may identify whether or not the blank regions for mirroring are included in the received image. Here, the blank regions for mirroring may refer to blank regions added to the image for the image to have the resolution according to, by way of example, the Miracast standard.

For example, the processor 130 may identify black regions 710 and 720 in an image displayed through the display 110, as illustrated in FIG. 7, and identify that regions corresponding to the black regions are blank regions. Here, the black regions 710 and 720 may be identified by analyzing a color value of the image displayed through the display 110. However, this is only an example, and the processor 130 may identify the blank regions included in the image displayed (or to be displayed) through the display 110 via other methods, such as an edge detection algorithm. Alternatively, the processor 130 may receive information on each blank region from the electronic apparatus 200, and recognize each blank region in the image for mirroring.

In addition, the processor 130 may crop the image of the remaining region excluding the blank regions in the image for mirroring. In this case, the processor 130 may crop an image 730 of a remaining region excluding the blank regions in further consideration of information on a pre-stored image ratio for each electronic apparatus.

To this end, the processor 130 may receive recognition information (e.g., identification information) of the electronic apparatus 200 from the electronic apparatus 200 through the communicator 120. In addition, the processor 130 may identify an image ratio corresponding to the recognition information on the basis of information on a pre-stored image ratio for each electronic apparatus.

For example, referring to FIG. 8, when it is identified that the electronic apparatus 200 is a third electronic apparatus on the basis of the recognition information of the electronic apparatus 200, the processor 130 may identify 9:18.5, which is an image ratio corresponding to the third electronic apparatus on the basis of the information on the pre-stored image ratio for each electronic apparatus. In addition, the processor 130 may crop an image of a region having an aspect ratio of 9:18.5 on the basis of a central region from the image for mirroring received from the electronic apparatus 200.

As described above, the display apparatus 100 according to an embodiment may more accurately crop a region in which a content is included by cropping the image in further consideration of the information on the pre-stored image ratio.

Then, the processor 130 may scale resolution of a cropped image 910 to correspond to the resolution of the display 110, as illustrated in FIG. 9. In addition, the processor 130 may display an image 920 of which resolution is scaled on the display 110. Therefore, the disclosure may display the image of the remaining region excluding the blank regions over the entire region of the display 110 and prevent a case where watching of the image by the user is hindered due to the blank regions.

Meanwhile, the processor 130 may not only identify the disposition state of the display 110 on the basis of a ratio of the image that is being displayed on the display 110, buy may also identify the disposition state of the display 110 on the basis of state information received for the display 110. Alternatively, the display apparatus 100 according to the disclosure may further include a sensor sensing rotation, such as a gyro sensor or the like, and the processor 130 may identify the disposition state of the display 110 on the basis of a state of the display 110 sensed by the sensor.

FIG. 10 is a view for describing a user interface (UI) for scaling of an image according to an embodiment.

When it is identified that the image in which the blank regions are included is received in a state where the display 110 is disposed in the vertical direction, the processor 130 may display an image of a remaining region excluding the blank regions on the display 110 disposed in the vertical direction.

Meanwhile, such an operation may not only be performed automatically when it is identified that the image in which the blank regions are included is received, but may also be performed on the assumption that a user command selecting a UI for displaying the image of the remaining region excluding the blank regions is received.

For example, referring to FIG. 10, when it is identified that the image in which the blank regions are included is received in the state where the display 110 is disposed in the vertical direction, the processor 130 may display a user interface (UI) 1010 (e.g., graphical user interface item, icon, etc.) for displaying the image of the remaining region excluding the blank regions. When a user command for selecting the UI 1010 through a button or the like provided in a remote control apparatus, the electronic apparatus 200, or the display apparatus 100 is received, the processor 130 may display the image of the remaining region excluding the blank regions on the display 110 disposed in the vertical direction.

Figure 11A:
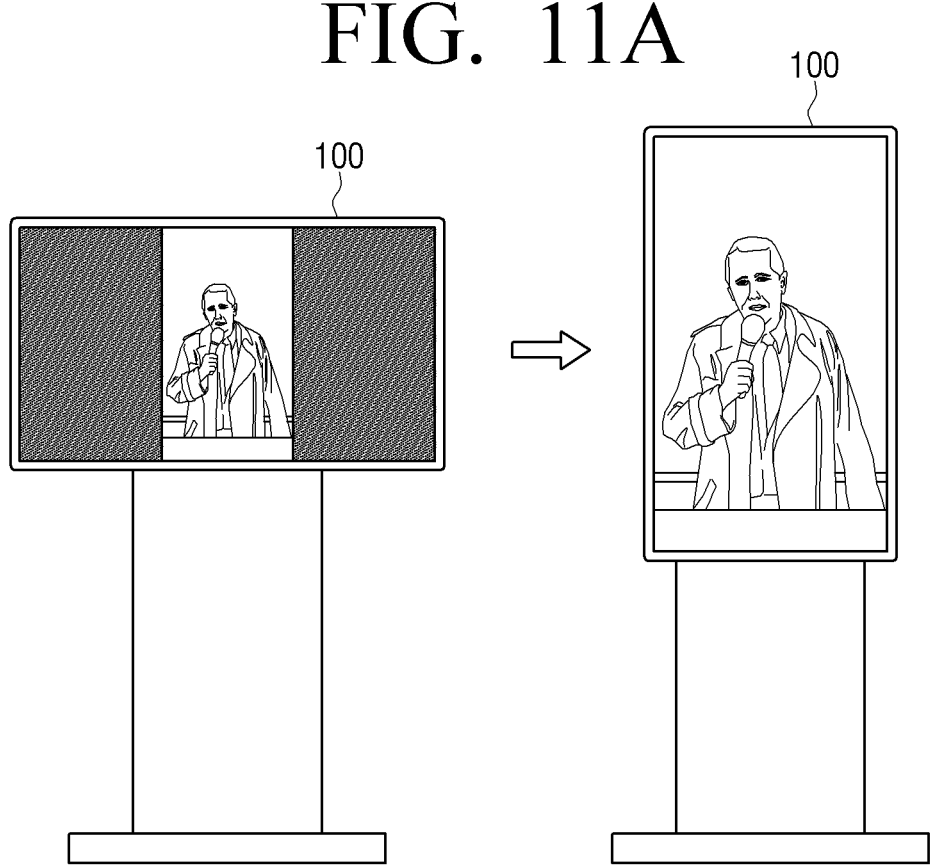
FIG. 11A is a view for describing an operation of the display apparatus in a case where an image in which blank regions are included is received in a state where a display according to an embodiment is horizontally disposed.
Figure 11B:
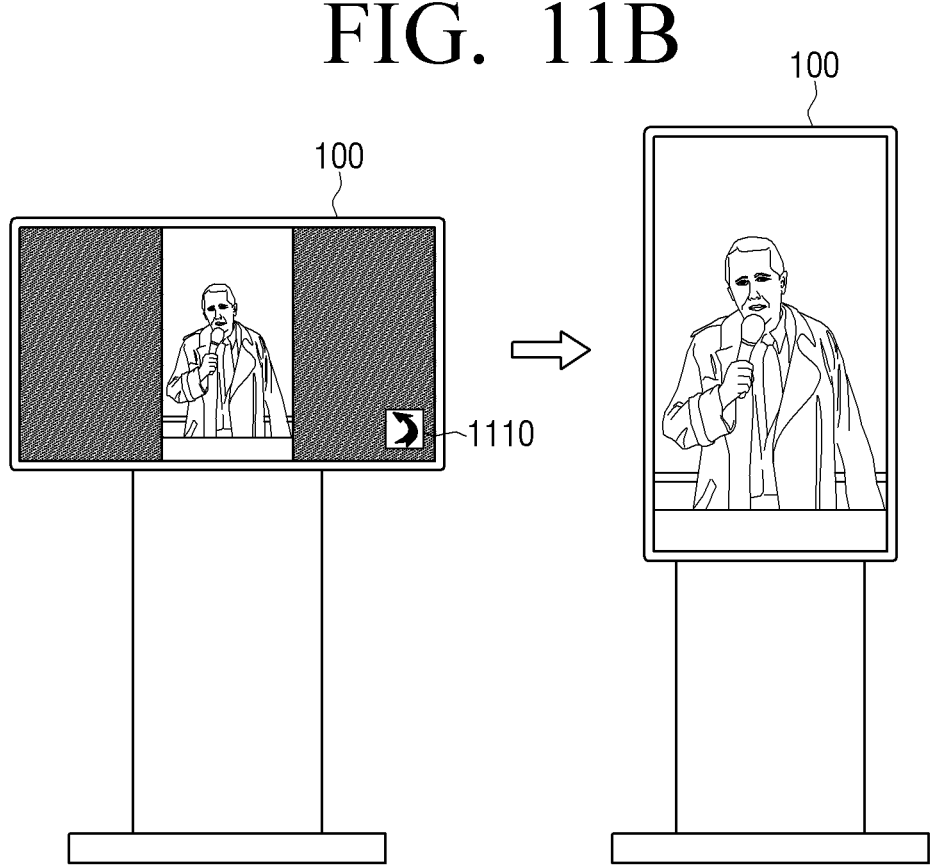
FIG. 11B is a view for describing a UI for rotation of a display according to an embodiment.

FIG. 11A is a view for describing an operation of the display apparatus 100 when an image in which blank regions are included is received in a state where a display according to an embodiment is horizontally disposed, and FIG. 11B is a view for describing a UI for rotation of a display according to an embodiment.

As described above, in a case where the image in which the blank regions are included is received in a state where the display 110 is horizontally disposed, the processor 130 may display the image for mirroring received from the electronic apparatus 200 on the display 110.

In this case, the processor 130 may control the display 110 disposed in the horizontal direction (i.e., in which width is greater than height) to rotate to the vertical direction (i.e., in which height is greater than width) and display the image of the remaining region excluding the blank regions through the display 110 disposed in the vertical direction, as illustrated in FIG. 11A.

In detail, the processor 130 may identify the blank regions in the image received from the electronic apparatus 200, crop the image of the remaining region excluding the blank regions, scale resolution of the cropped image to correspond to the resolution of the display disposed in the vertical direction, and then display the cropped image of which resolution is scaled.

Alternatively, the processor 130 may display a UI 1110 for rotation of the display 110 on one region of the display 110 disposed in the horizontal direction, rotate the display 110 in the vertical direction based on a user command for selecting the UI 1110 being received, and display the image of the remaining region excluding the blank regions from the image received from the electronic apparatus 200 on the display 110 disposed in the vertical direction, as illustrated in FIG. 11B.

Meanwhile, only the UI 1110 for rotation is illustrated in FIG. 11B, but the processor 130 may further display a message for inducing, inquiring, or requesting feedback from the user to rotate the display, such as "rotate the display in the vertical direction." Therefore, the user may watch the image from which the blank regions are excluded.

Figure 12A:
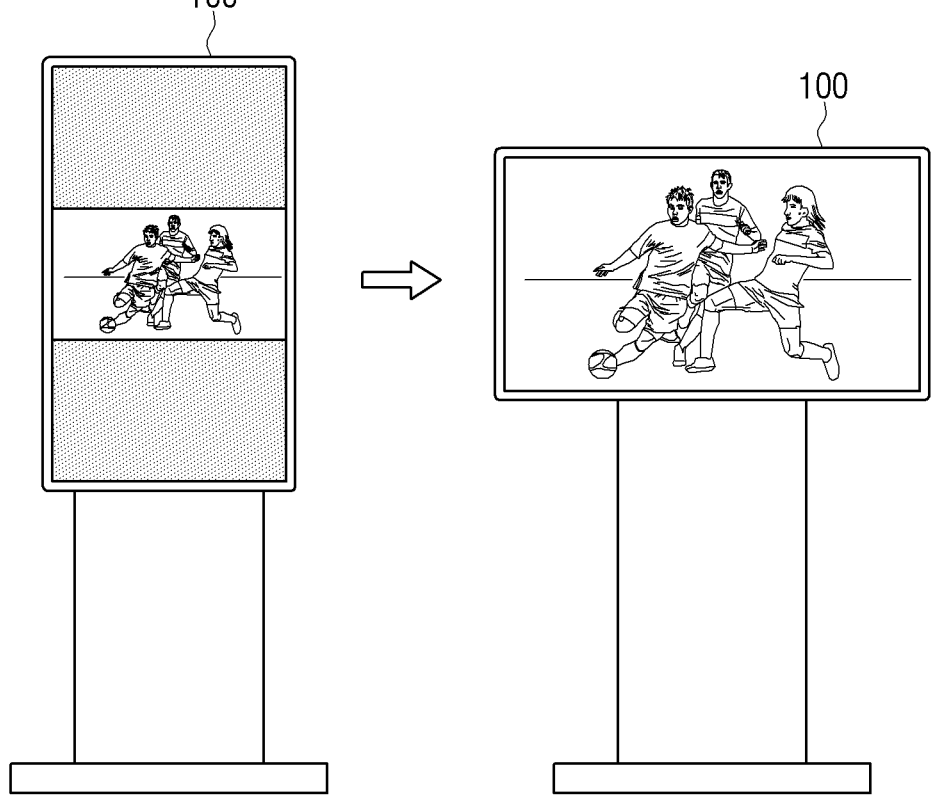
FIG. 12A is a view for describing an operation of the display apparatus in a case where an image in which blank regions are not included is received in a state where a display according to an embodiment is vertically disposed.
Figure 12B:
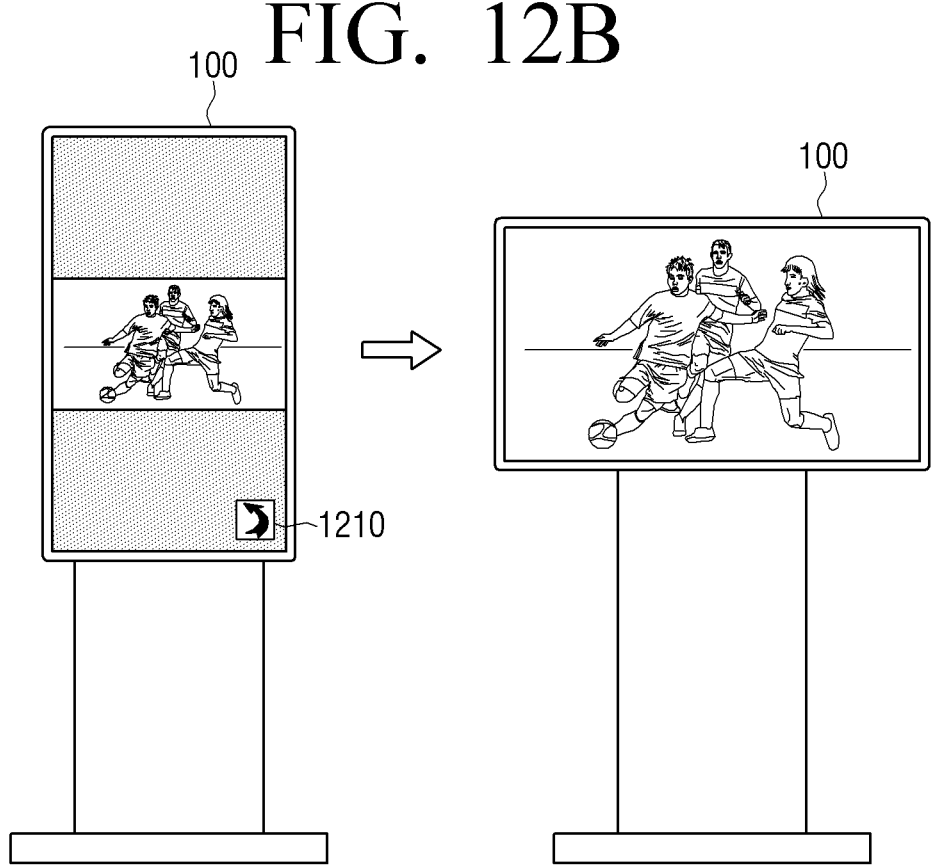
FIG. 12B is a view for describing a UI for rotation of a display according to an embodiment.

FIG. 12A is a view for describing an operation of the display apparatus 100 when an image in which blank regions are not included is received in a state where a display according to an embodiment is vertically disposed, and FIG. 12B is a view for describing a UI for rotation of a display according to an embodiment.

As described above, in a case where the blank regions for mirroring are not included in the image received from the electronic apparatus 200, the processor 130 may display the images 210 and 310 for mirroring received from the electronic apparatus 200 regardless of whether or not the disposition state of the display 110 is horizontal or vertical.

Meanwhile, in a case where the image in which the blank regions are not included is received from the electronic apparatus 200 in a state where the display 110 is disposed in the vertical direction, as illustrated in FIG. 12A, the processor 130 may control the display 110 disposed in the vertical direction to rotate in the horizontal direction, and display the image received from the electronic apparatus 200 through the display 110 disposed in the horizontal direction.

Alternatively, the processor 130 may display a UI 1210 for rotation of the display 110 on one region of the display 110 disposed in the vertical direction, rotate the display 110 in the horizontal direction based on a user command for selecting the UI 1210 being received, and display the image received from the electronic apparatus 200 on the display 110 disposed in the horizontal direction, as illustrated in FIG. 12B.

Meanwhile, only the UI 1210 for rotation is illustrated in FIG. 12B, but the processor 130 may further display a message for inducing, inquiring, or requesting feedback from the user to rotate the display, such as "rotate the display in the horizontal direction." Accordingly, the user may watch the image through an entire screen of the display 110.

Figure 13:
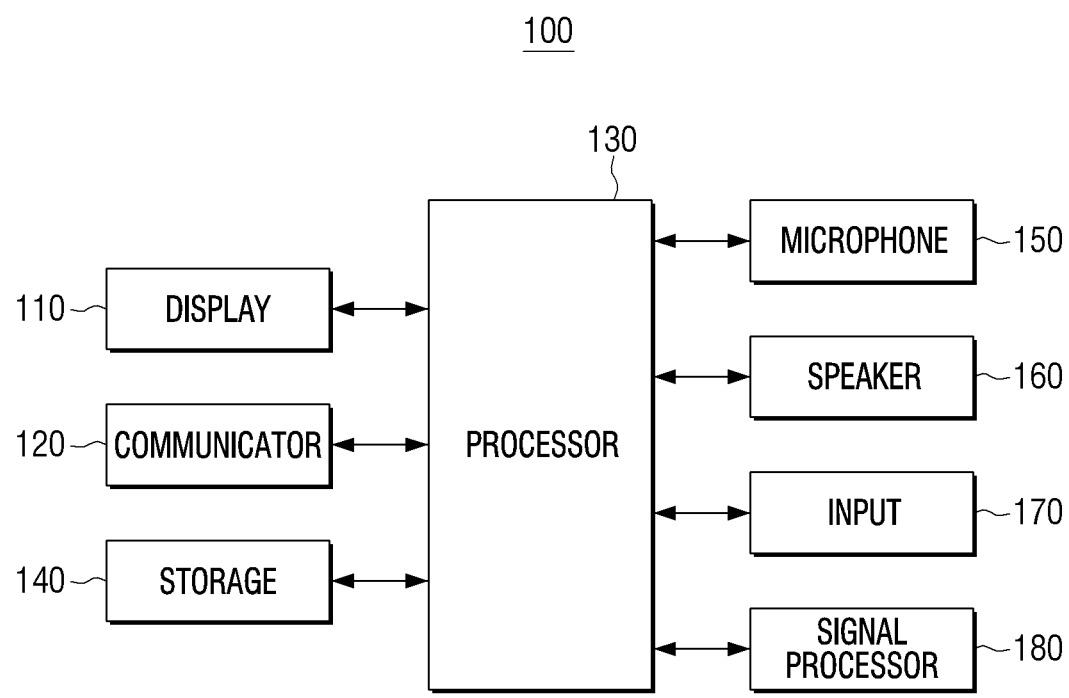
FIG. 13 is a detailed block diagram for describing the display apparatus according to an embodiment.

FIG. 13 is a detailed block diagram for describing a display apparatus 100 according to an embodiment.

Referring to FIG. 13, the display apparatus 100 according to an embodiment may include the display 110, the communicator 120, a storage 140, a microphone 150, a speaker 160, an input 170 (e.g., input unit or inputter), a signal processor 180, and the processor 130. A description of portions overlapping or redundant with those described above will be omitted or abbreviated below.

The storage 140 may store an operating system (OS) for controlling a general operation of components of the display apparatus 100 and commands, instructions, or data related to the components of the display apparatus 100.

Accordingly, the processor 130 may control a plurality of hardware and/or software components of the display apparatus 100 using various commands, instructions, data or the like stored in the storage 140, load and process a command, an instruction, or data received from at least one of other components to a volatile memory, and store various data in a non-volatile memory.

Particularly, the storage 140 may store information on the image ratio and/or the resolution for each of plural electronic apparatuses.

The microphone 150 receives a user speech. Here, the user speech may be a speech for executing a specific function of the display apparatus 100. When the user speech is received through the microphone 150, the processor 130 may analyze the user speech through a speech to text (STT) algorithm, and perform a function corresponding to the user speech.

The speaker 160 may output various audio signals. For example, the speaker 160 may output an audio signal in a case of displaying the image of the remaining region excluding the blank regions in the image for mirroring or in a case of rotating the display 110.

The input 170 may receive various user commands. The processor 130 may execute a function corresponding to a user command input through the input 170.

For example, the input 170 may receive a user command for displaying the image of the remaining region excluding the blank regions in the image for mirroring, and the processor 130 may display the image of the remaining region excluding the blank regions on the display 110 according to a user input. In addition, the input 170 may receive a user command for performing turn-on, channel change, volume adjustment, or the like, and the processor 130 may turn on the display apparatus 100 or perform the channel change, the volume adjustment, or the like depending on the received user command.

To this end, the input 170 may be implemented by an input panel. The input panel may be implemented by a touch pad or a key pad including various functional keys, numeric keys, special keys, character keys, and the like, or in a touch screen manner.

The signal processor 180 may perform signal processing on a content received through the communicator 120. In detail, the signal processor 180 may perform operations such as decoding, scaling, frame rate conversion, and the like, on an image configuring the content to make, render, or reproduce the image a form in which the image may be output from the display apparatus 100. In addition, the signal processor 180 may perform signal processing such as decoding or the like on an audio signal configuring the content to make the audio signal in a form in which the audio signal may be output from the speaker 160.

Accordingly, the display 110 may display the image or the like output from the signal processor 180, and the speaker 160 may output the audio output from the signal processor 180.

Meanwhile, the display apparatus 100 according to an embodiment may further include a motor for rotating the display 110. When (e.g., based on) a user command for rotation of the display 110 is received, the processor 130 may transmit a control signal to the motor to rotate the display 110.

FIG. 14 is a flowchart for describing a control method of a display apparatus according 100 to an embodiment.

The display apparatus 100 according to an embodiment may receive the image for mirroring from the electronic apparatus (S1410). Here, the content that is being displayed on the electronic apparatus 200 and the blank regions may be included in the image for mirroring. In detail, the electronic apparatus 200 may transmit an image in which the blank regions are inserted into the left and right of a region corresponding to the content that is being displayed on the electronic apparatus 200 on the basis of the Miracast standard to the display apparatus 100.

In addition, the display apparatus 100 may identify whether or not the blank regions for mirroring are included in the image received from the electronic apparatus 200

(S1420). For example, the display apparatus 100 may confirm the black regions on the basis of pixel values of the display apparatus and identify that the regions corresponding to the black regions are the blank regions.

Furthermore, when it is identified that the image in which the blank regions are included is received in a state where the display 110 is disposed in a predetermined direction, the display apparatus 100 may display the image of the remaining region excluding the blank region in the received image on the display 110 disposed in the predetermined direction (S1430).

Therefore, the display apparatus 100 according to an embodiment may display the content that is being displayed on the electronic apparatus 200 over the entire region of the display 100 to increase an immersion level of the watching of the image by the user.

Meanwhile, an example of a case where the blank regions are inserted into the left and right of the region corresponding to the content that is being displayed on the electronic apparatus 200 has been described hereinabove. It is understood, however, that one or more other embodiments are not limited thereto, and the technical spirit described above may also be applied to a case where the blank regions are inserted into the top and bottom or the top and bottom and the left and right of the region corresponding to the content that is being displayed on the electronic apparatus 200.

Also, methods according to one or more embodiments described above may be implemented in a form of software and/or an application that may be installed in a display apparatus.

Furthermore, methods according to one or more embodiments described above may be implemented by software upgrade or hardware upgrade for a display apparatus.

In addition, one or more embodiments described above may also be performed through an embedded server provided in the display apparatus or a server disposed outside the display apparatus.

Meanwhile, a non-transitory computer readable medium storing a program or instructions sequentially or at least partially simultaneously performing a control method of a display apparatus according to one or more embodiments may be provided.

The non-transitory computer readable medium may be a medium that semi-permanently stores data and is readable by an apparatus. In detail, various applications, programs, and/or processor-executable instructions described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although certain embodiments have been illustrated and described hereinabove, the disclosure is not limited to these embodiments, but may be variously modified by those skilled in the art to which the disclosure pertains without departing from the scope and spirit of the disclosure as claimed in the claims. These modifications should also be understood to fall within the technical spirit and scope of the disclosure.

What is claimed is:

1. A display apparatus comprising:
a display;
a communicator comprising circuitry configured to communicate with an electronic apparatus;
a processor configured to:
identify whether blank regions are included in an image for mirroring based on the image for mirroring being received from the electronic apparatus through the communicator, and
control to display, on the display, an image of a remaining region excluding the blank regions in the received image based on the blank regions being identified in the received image in a state in which the display is oriented in a predetermined direction,
obtain, from the electronic apparatus, identification information of the electronic apparatus and identify an image ratio corresponding to the identification information based on pre-stored information on image ratios for each of plural external electronic apparatuses, and
crop, based on the identified image ratio, the received image to obtain the image of the remaining region corresponding to the image ratio,
wherein based on the blank regions being identified in the received image, the processor is configured to crop the received image to obtain the image of the remaining region excluding the blank regions, scales a resolution of the cropped image to correspond to a resolution of the display, and
wherein the image displayed on the display is the image of which the resolution is scaled.

2. The display apparatus as claimed in claim 1, wherein the image received from the electronic apparatus is received based on a Miracast standard.

3. The display apparatus as claimed in claim 1, wherein the processor is further configured to control to display, on the display oriented in a vertical direction, the image of the remaining region excluding the blank regions based on the blank regions being identified in the received image in a state in which the display is oriented in the vertical direction.

4. The display apparatus as claimed in claim 3, wherein the processor is further configured to control to display, on the display, a user interface (UI) item selectable for displaying the image of the remaining region excluding the blank regions and to display, on the display oriented in the vertical direction, the image of the remaining region on based on a user command for selecting the UI item being received.

5. The display apparatus as claimed in claim 1, wherein the processor is further configured to control to rotate the display to a vertical direction and to display, on the display oriented in the vertical direction, the image of the remaining region excluding the blank regions, in a case in which the image including the blank regions is received while the display is oriented in a horizontal direction.

6. The display apparatus as claimed in claim 1, wherein the processor is further configured to control to display, on the display, the received image, control to display a UI item selectable for rotation of the display, control to rotate the display to a vertical direction based on a user command for selecting the UI item being received, and control to display, on the display oriented in the vertical direction, the image of the remaining region excluding the blank regions, in a case in which the image including the blank regions is received while the display is oriented in a horizontal direction.

7. The display apparatus as claimed in claim 1, wherein the processor is further configured to control to display, on the display, the received image, control to display, on the display, a UI item selectable for rotation of the display, control to rotate the display to a horizontal direction based on a user command for selecting the UI item being received, and control to display, on the display oriented in the horizontal direction, the received image, in a case in which the received image does not include the blank regions and is received while the display is disposed in a vertical direction.

8. The display apparatus as claimed in claim 1, wherein the processor is further configured to identify black regions in the received region and determine that regions corresponding to the black regions are the blank regions.

9. The display apparatus as claimed in claim 1, wherein:
the received image includes a content that is being displayed on the electronic apparatus, and
the processor is configured to control to display, on the display, the image of the remaining region excluding the blank regions based on identifying that the blank regions are positioned to a left and to a right of the remaining region corresponding to the content.

10. A control method of a display apparatus, the control method comprising:
receiving an image for mirroring from an electronic apparatus;
identifying whether blank regions are included in the received image; and
displaying, on a display of the display apparatus, an image of a remaining region excluding the blank regions in the received image based on the blank regions being identified in the received image in a state in which the display is oriented in a predetermined direction,
wherein the displaying comprises:
cropping the received image to obtain the image of the remaining region excluding the blank regions;
receiving, from the electronic apparatus, identification information of the electronic apparatus;
identifying an image ratio corresponding to the identification information based on pre-stored information on image ratios for each plural external electronic apparatuses;
cropping, based on the identified image ratio, the received image to obtain the image of the remaining region corresponding to the image ratio;
scaling a resolution of the cropped image to correspond to a resolution of the display; and
displaying, on the display, the image of which the resolution is scaled.

11. The control method as claimed in claim 10, wherein the image received from the electronic apparatus is received based on a Miracast standard.

12. The control method as claimed in claim 10, wherein the displaying comprises displaying, on the display oriented in a vertical direction, the image of the remaining region excluding the blank regions based on the blank regions being identified in the received image in a state in which the display is oriented in the vertical direction.

13. The control method as claimed in claim 12, wherein the displaying on the display oriented in the vertical direction comprises:
displaying, on the display, a user interface (UI) item selectable for displaying the image of the remaining region excluding the blank regions; and
displaying, on the display oriented in the vertical direction, the image of the remaining region based on a user command for selecting the UI being received.

14. The control method as claimed in claim 10, wherein the displaying comprises, based on the image including the blank regions being received while the display is oriented in a horizontal direction:
rotating the display to a vertical direction; and
displaying, on the display oriented in the vertical direction, the image of the remaining region excluding the blank regions.

15. The control method as claimed in claim 10, wherein the displaying comprises, based on the image including the blank regions being received while the display is oriented in a horizontal direction:
displaying, on the display oriented in the horizontal direction, the received image;
displaying, on the display oriented in the horizontal direction, a UI item selectable for rotation of the display;
rotating the display to a vertical direction based on a user command for selecting the UI item being received; and
displaying, on the display oriented in the vertical direction, the image of the remaining region excluding the blank regions.

16. The control method as claimed in claim 10, wherein the displaying comprises, based on the image not including the blank regions being received while the display is oriented in a vertical direction:
displaying, on the display oriented in the vertical direction, the received image;
displaying, on the display oriented in the vertical direction, a UI item selectable for rotation of the display;
rotating the display to a horizontal direction based on a user command for selecting the UI item being received; and
displaying, on the display oriented in the horizontal direction, the received image.

* * * * *